(12) United States Patent
Nickel et al.

(10) Patent No.: US 7,251,567 B2
(45) Date of Patent: Jul. 31, 2007

(54) ELECTRONICALLY CALIBRATED BEACON FOR A HORIZONTAL DIRECTIONAL DRILLING MACHINE

(75) Inventors: Frank S. Nickel, Perry, OK (US); Martin A. Williams, Tulsa, OK (US)

(73) Assignee: The Charles Machine Works, Inc., Perry, OK (US)

( * ) Notice: Subject to any disclaimer, the term of this patent is extended or adjusted under 35 U.S.C. 154(b) by 358 days.

(21) Appl. No.: 10/365,596

(22) Filed: Feb. 12, 2003

(65) Prior Publication Data

US 2006/0161351 A1 Jul. 20, 2006

(51) Int. Cl.
*G01V 1/40* (2006.01)
(52) U.S. Cl. .................. 702/9; 702/6; 702/7; 702/16
(58) Field of Classification Search .............. 175/45; 324/326, 332, 333, 334; 33/719, 702, 711, 33/302, 304; 702/6, 7, 9, 16; 73/152.01; 178/18
See application file for complete search history.

(56) References Cited

U.S. PATENT DOCUMENTS

| | | | |
|---|---|---|---|
| 4,575,581 A * | 3/1986 | Langberg | 178/18.02 |
| 5,585,726 A * | 12/1996 | Chau | 324/326 |
| 5,703,484 A | 12/1997 | Bieberdorf et al. | 324/207.22 |
| 5,767,678 A | 6/1998 | Mercer | 324/326 |
| 5,850,624 A | 12/1998 | Gard et al. | 702/92 |
| 5,880,680 A | 3/1999 | Wisehart et al. | 340/853.4 |
| 6,008,651 A | 12/1999 | Mercer | 324/326 |
| 6,232,780 B1 | 5/2001 | Mercer | 324/326 |
| 6,315,062 B1 * | 11/2001 | Alft et al. | 175/45 |

OTHER PUBLICATIONS

International Drilling Services Limited The IDS-Brewis Universal Sonde Housing Making Drilling a Walk Over, Whatever the Ground Conditions; Oct. 1998; 2 pages.

\* cited by examiner

*Primary Examiner*—Michael Nghiem
*Assistant Examiner*—Stephen J. Cherry
(74) *Attorney, Agent, or Firm*—Tomlinson & O'Connell, PC

(57) ABSTRACT

A monitoring system for use with a horizontal directional drilling machine and adapted to determine the roll and/or pitch orientation of the downhole tool assembly by detecting signals from a sensor assembly supported by the downhole tool assembly. In a preferred embodiment, the monitoring system uses an antenna assembly to detect a signal transmitted from the sensor assembly. The antenna assembly transmits the detected signal to a processor which determines a calibration factor indicative of the actual orientation of the sensor relative to the known orientation of the downhole tool assembly. The processor then uses the calibration factor and the signal emitted from the sensor, indicative of the actual orientation of the sensor, to determine the actual orientation of the downhole tool assembly.

36 Claims, 6 Drawing Sheets

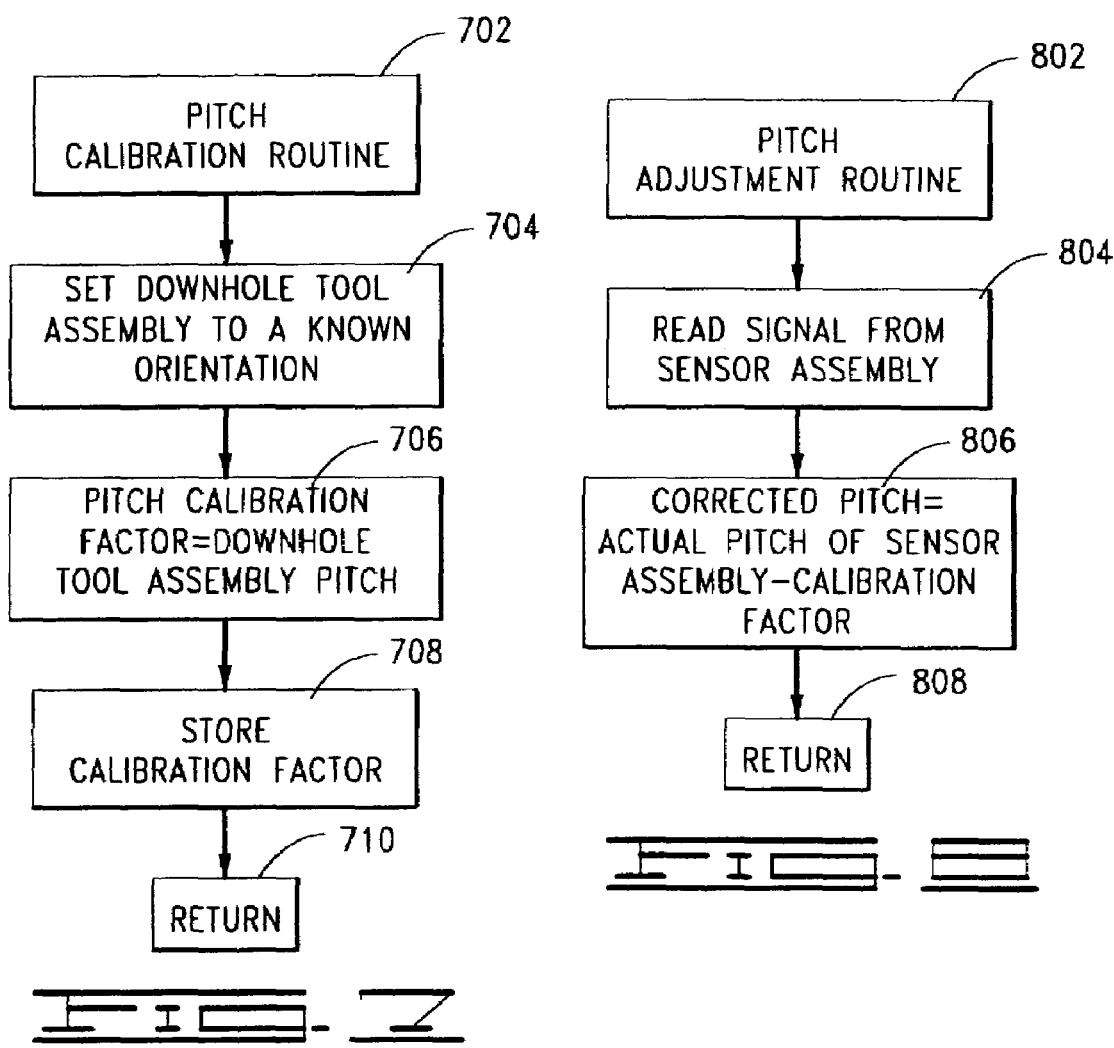

ELECTRONICALLY CALIBRATED BEACON FOR A HORIZONTAL DIRECTIONAL DRILLING MACHINE

FIELD OF THE INVENTION

The present invention relates generally to the field of determining the position and orientation of underground objects, and in particular to the calibration of sensors used to monitor the orientation and position of a downhole tool assembly.

SUMMARY OF THE INVENTION

The present invention is directed to a horizontal directional drilling system. The horizontal directional drilling system comprises a horizontal directional drilling machine, a drill string connectable to the horizontal directional drilling machine, a downhole tool assembly supported on the drill string, and a monitoring system adapted to monitor the position and orientation of the downhole tool assembly. A sensor assembly is supported on the downhole tool assembly for movement therewith. The sensor assembly is adapted to transmit at least one signal indicative of an actual orientation of the sensor assembly while the downhole tool assembly is in use. The monitoring system comprises an antenna assembly and a processor assembly. The antenna assembly is adapted to detect the signal from the sensor assembly and to transmit the detected signal. The processor assembly is adapted to predetermine a calibration factor indicative of the actual orientation of the sensor assembly relative to a known downhole tool assembly orientation, to receive the detected signal from the sensor assembly while the downhole tool assembly is in use, to process the detected signal according to the predetermined calibration factor, and to determine the actual orientation of the downhole tool assembly using the actual orientation of the sensor assembly and the calibration factor.

The invention further includes a monitoring system for use with a horizontal directional drilling machine. The monitoring system is adapted to monitor the position and orientation of a downhole tool assembly. The downhole tool assembly has a sensor assembly supported thereon for movement with the downhole tool assembly and adapted to transmit at least one signal indicative of the actual orientation of the sensor assembly. The monitoring system comprises an antenna assembly and a processor. The antenna assembly is adapted to detect the signal from the sensor assembly and to transmit the detected signal. The processor assembly is adapted to predetermine a calibration factor indicative of the actual orientation of the sensor assembly relative to a known downhole tool assembly orientation, to receive the detected signal from the sensor assembly while the downhole tool assembly is in use, to process the detected signal according to the predetermined calibration factor, and to determine the actual orientation of the downhole tool assembly using the actual orientation of the sensor assembly and the calibration factor.

Still further, the present invention includes a method for monitoring the orientation of a downhole tool assembly. The downhole tool assembly has a sensor assembly adapted to detect changes in orientation of the downhole tool assembly during a boring operation. The method comprises the steps of positioning the downhole tool assembly at a known orientation, detecting at least one signal from the sensor assembly, processing the signal, and monitoring changes in the orientation of the downhole tool assembly. The signal from the sensor assembly is indicative of an actual orientation of the sensor assembly. The signal is processed to electronically calculate a calibration factor corresponding to the difference between the known orientation of the downhole tool assembly and the actual orientation of the sensor assembly. Changes in the orientation of the downhole tool assembly are monitored by calculating the actual orientation of the downhole tool assembly using the actual orientation of the sensor assembly and the calibration factor.

In another aspect the invention is directed to a method for boring underground using a horizontal directional drilling system. The system comprises a horizontal directional drilling machine having a drill string operatively connected to the drilling machine, a downhole tool assembly with a sensor assembly supported thereon, and an above-ground antenna assembly. The method comprises positioning the downhole tool assembly at a known orientation, transmitting a signal from the sensor assembly indicative of an actual orientation of the sensor assembly, sensing the signal using the above-ground antenna assembly, processing the signal to electronically predetermine a calibration factor corresponding to the difference between the known orientation of the downhole tool assembly and the actual orientation of the sensor assembly, advancing and altering the position of the downhole tool assembly to move the downhole tool assembly along a boring path, and monitoring changes in the orientation of the downhole tool assembly as it travels along the boring path by calculating the actual orientation of the downhole tool assembly using the actual orientation of the sensor assembly and the calibration factor.

In yet another aspect, the present invention is directed to a method for drilling a borehole using a horizontal directional drilling system. The system comprises a horizontal directional drilling machine having a drill string, a downhole tool assembly, and an above-ground monitoring system. The drill string is operatively connected to the drilling machine and the downhole tool assembly is operatively connected to the drill string. A sensor assembly is supported by the downhole tool assembly. The method comprises positioning the downhole tool assembly at a known position and transmitting a signal from the sensor assembly indicative of an actual orientation of the sensor assembly. The above-ground monitoring system senses the signal. The signal is processed to electronically predetermine a calibration factor corresponding to the difference between the known orientation of the downhole tool assembly and the actual orientation of the sensor assembly. The downhole tool assembly position is advanced and altered in response to the signal by operating the horizontal directional drilling machine to move the downhole tool assembly along the boring path. Changes in the orientation of the downhole tool assembly are monitored by calculating an actual orientation of the downhole tool assembly using the actual orientation of the sensor assembly and the calibration factor.

BRIEF DESCRIPTION OF THE DRAWINGS

FIG. 1 further illustrates the use of a monitoring system to monitor the position and orientation of the downhole tool assembly.

FIG. 3 illustrates an arrangement of antennas forming the antenna assembly.

FIG. 7 is a flow chart illustrating a pitch calibration routine used to determine a calibration factor indicative of the actual pitch orientation of the sensor assembly relative to a known downhole tool assembly pitch orientation.

FIG. 8 is a flow chart illustrating a pitch adjustment routine used to determine the actual pitch orientation of the downhole tool assembly.

DETAILED DESCRIPTION OF THE PREFERRED EMBODIMENTS

Horizontal directional drilling (HDD) permits the installation of utility services or other products underground in an essentially "trenchless" manner, eliminating surface disruption along the length of the project and reducing the likelihood of damaging previously buried products. The typical HDD borepath begins from the ground surface as an inclined segment that is gradually leveled off as the desired product installation depth is neared. This depth is maintained— or a near horizontal path may be desirable instead—for the specified length of the product installation. The presence of previously buried products has given rise to a need for methods and apparatuses that allow for steering of a boring tool as it moves along borepath.

To steer the boring tool, it is important to know the roll, pitch and yaw orientation of the downhole tool assembly. Various sensor assemblies have been developed to provide the operator with information concerning the roll, pitch and/or yaw of the downhole tool assembly. However, a problem is sometimes encountered where the orientation of the sensor assembly is not matched with the corresponding orientation of the downhole tool assembly. The problem is magnified when the downhole tool assembly comprises, for example, a removable drilling bit that is threaded to a housing supported on the downhole end of a drill string. As a sensor assembly traditionally sits in the housing in a fixed position, orienting the boring tool, or other downhole tool, with the orientation of the sensor assembly has been difficult. Current techniques include aligning the downhole tool assembly with the orientation of the sensor assembly using shims with a threaded connection or designing the boring tool so that it can be connected to the housing in only one position relative to the sensor assembly.

The present invention provides the ability to electronically adjust the orientation of the sensor assembly to match the orientation of the downhole tool assembly without concern for how the sensor assembly is supported within the downhole tool assembly or with the type of connection between the boring tool and the housing. With the present invention, the orientation of the sensor assembly may be adjusted electronically without the need for removing the boring tool from the housing or repositioning the sensor assembly within the housing. While the preferred application of this invention is to near surface HDD, the sensor assembly of this invention may be applied to other machines and devices which require electronics to be similarly oriented to a connected device.

Figure 1:
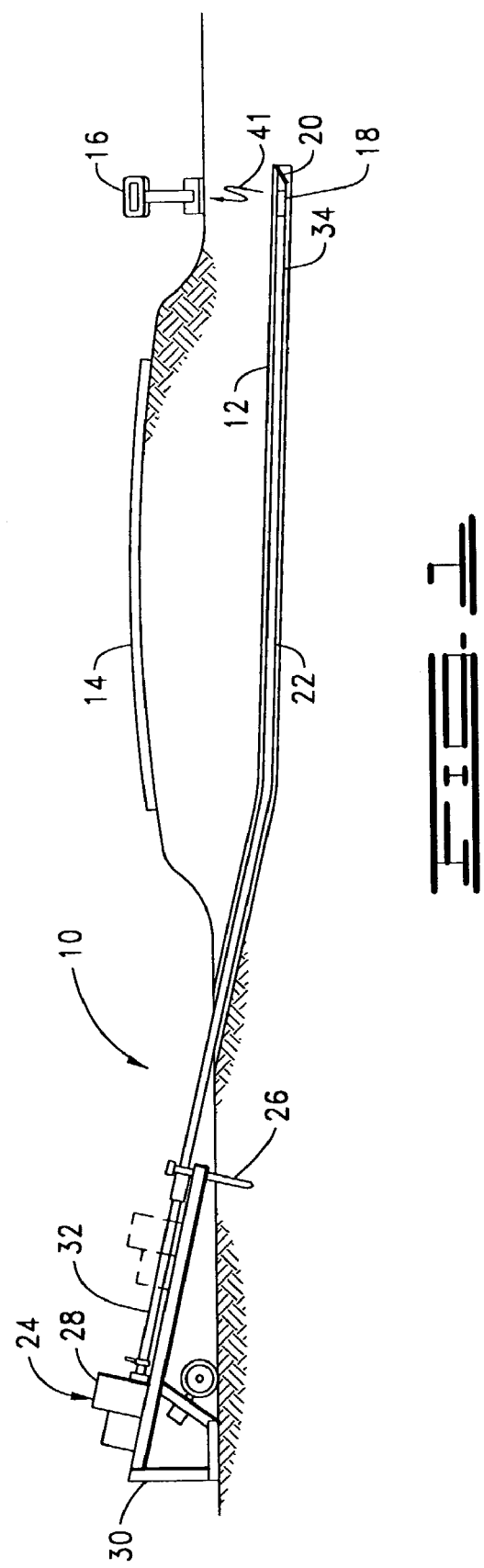
FIG. 1 is a diagrammatic representation of a horizontal directional drilling machine acting on an uphole end of a drill string that in turn, supports a downhole tool assembly having a sensor assembly supported thereon.

With reference now to the drawings in general and FIG. 1 in particular, there is shown therein a HDD system 10 suitable for the subsurface placement of utility services. FIG. 1 illustrates the usefulness of near surface HDD by illustrating that a borehole 12 can be made without disturbing an above-ground structure, namely the roadway as denoted by reference numeral 14. FIG. 1 also illustrates the present invention by showing the use of a monitoring system 16 to monitor the position and orientation of a downhole tool assembly 18, comprising a directional boring tool 20, operatively connected to a drill string 22. As used herein, directional boring tool 20 is intended to refer to any drilling bit or boring tool which may cause deviation of the tool from a straight path. A directional boring tool used with the present invention, when operated in accordance with the present invention, will have a steering capability to enable the downhole tool assembly 18 to direct the path of the borehole 12.

Referring still to FIG. 1, the HDD system 10 generally comprises an HDD machine 24, the drill string 22, the monitoring system 16, the downhole tool assembly 18, and an earth anchor 26. The HDD machine 24 comprises a rotary drive system 28 movably supported on a frame 30 between a first position and a second position. Movement of the rotary drive system 28 by way of an axial advancement means (not shown) between the first position and the second position, axially advances the drill string 22, downhole tool assembly 18, and directional boring tool 20 through the borehole 12. The earth anchor 26 is driven into the earth to stabilize the frame 30 against the axial force exerted by the movement of the rotary drive system 28 during the axial advancement of the downhole tool assembly 18 and directional boring tool 20.

The drill string 22 is operatively connected to the rotary drive system 28 at a first end 32. The downhole tool assembly 18 is operatively connected to a downhole second end 34 of the drill string 22. The drill string 22 transmits torque and thrust to the downhole tool assembly 18 and directional boring tool 20 to drill the subsurface borehole 12.

Figure 2:
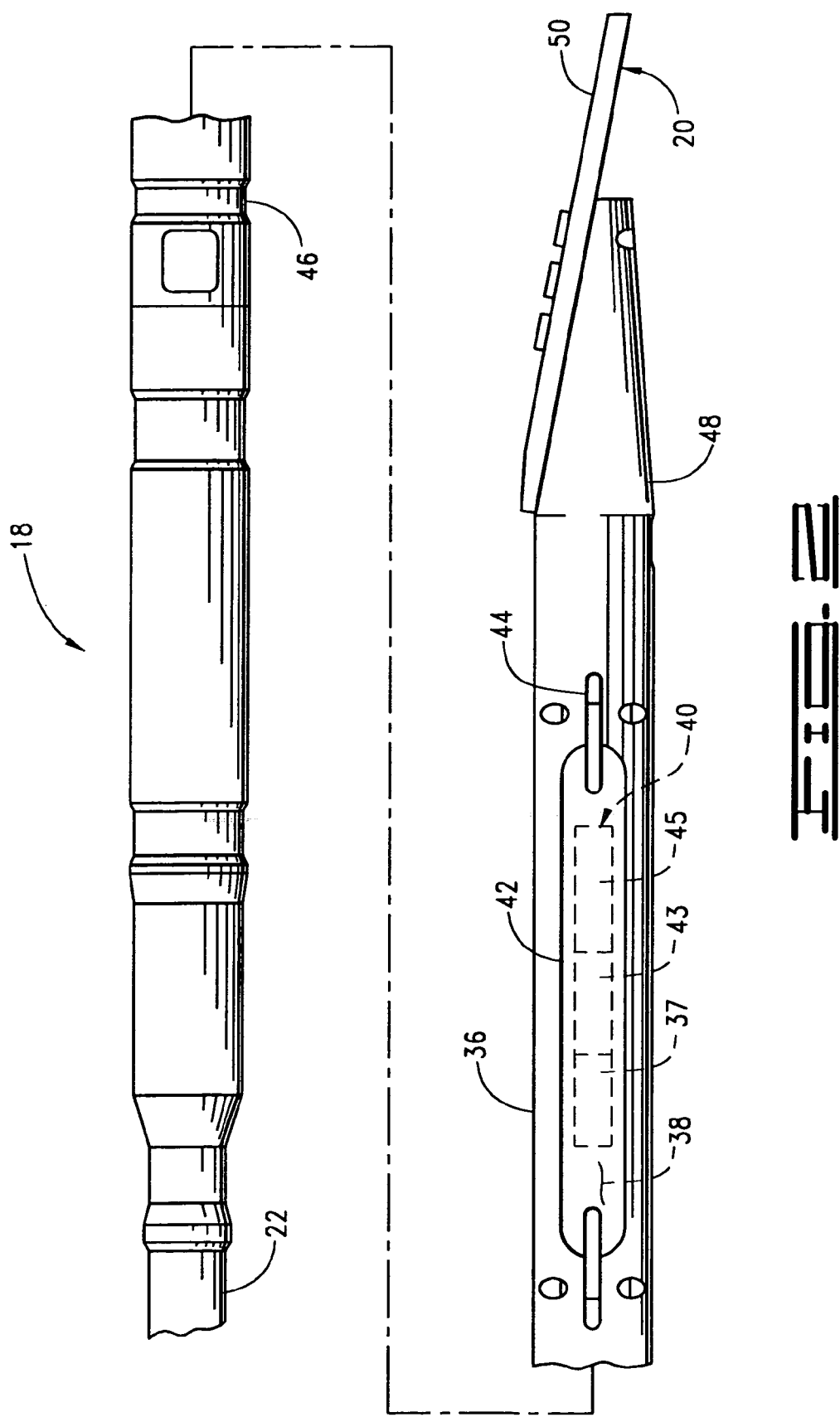
FIG. 2 is a side elevational view of a downhole tool assembly used in the present invention.

Turning now to FIG. 2, there is shown therein the downhole tool assembly 18 constructed in accordance with the present invention. The downhole tool assembly 18 comprises a housing 36 and the directional boring tool 20.

The housing 36 comprises a chamber 38 for housing the sensor assembly 40. The housing 36 has a threaded connection at a rear end 46 for connection to the drill string 22. The sensor assembly 40 is adapted to transmit at least one signal indicative of an actual orientation of the sensor assembly while the downhole tool assembly 18 is in use.

The sensor assembly 40 may comprise a conventional transmitter or beacon supported by the housing 36 for movement therewith. Preferably, a conventional sensor assembly 40 for use with the present invention will include one or more sensors 37 for measuring information representative of one or more of three angular orientations of the downhole tool assembly 18: roll, pitch and yaw. A processor 43 attaches the orientation information, by well-known amplitude or frequency modulation techniques, onto a signal 41 (FIG. 1) transmitted by a transmitting antenna 45 to the monitoring system 16 (shown in FIG. 1). The signal 41 is processed by the monitoring system 16 to determine the position and orientation of the downhole tool assembly 18.

As shown in FIG. 2, the housing 36 has a side-entry opening 42 to receive the sensor assembly 40, which is held therein by a slotted retaining cover 44. It should be noted that a front-loading or end-loading housing could also be utilized without departing from the spirit of the invention. Preferably, the sensor assembly 40 and sensors 37 are maintained in substantially parallel axial alignment with respect to the central axis of the housing 36. Sensor assemblies and associated internal sensors suitable for use with the present invention are disclosed in U.S. Pat. No. 5,264,795, issued to Rider, U.S. Pat. No. 5,703,484, issued to Bieberdorf, et al., U.S. Pat. No. 5,850,624, issued to Gard, et al., and U.S. Pat. No. 5,880,680, issued to Wisehart, et al., the contents of which are incorporated herein by reference.

The directional boring tool 20 is attached to the front end 48 of the housing 36. As shown in the embodiment of FIG. 2, the front end 48 of the housing 36 may be configured for the attachment of a boring tool comprising a flat blade drill bit 50. Preferably, the flat blade drill bit 50 is bolted onto the housing 36 at an acute angle of approximately 10° to the central axis of the housing 36. While the flat blade drill bit 50 is shown herein, it should be noted that any other directional boring tool or mechanisms which may cause deviation of the drill string may be used with the present invention. Such boring tools and mechanisms include single roller cone bits, carbide studded cobble drilling bits, replaceable tooth rock drilling bits, and bent-sub assemblies. Directional boring tools and mechanisms suitable for use with the present invention are described in U.S. Pat. No. 5,490,569 issued to Brotherton et al., U.S. Pat. No. 5,799,740, issued to Stephenson, et al., and U.S. Pat. No. 6,311,790, issued to Beckwith et al., the contents of which are incorporated herein by reference.

Figure 3:
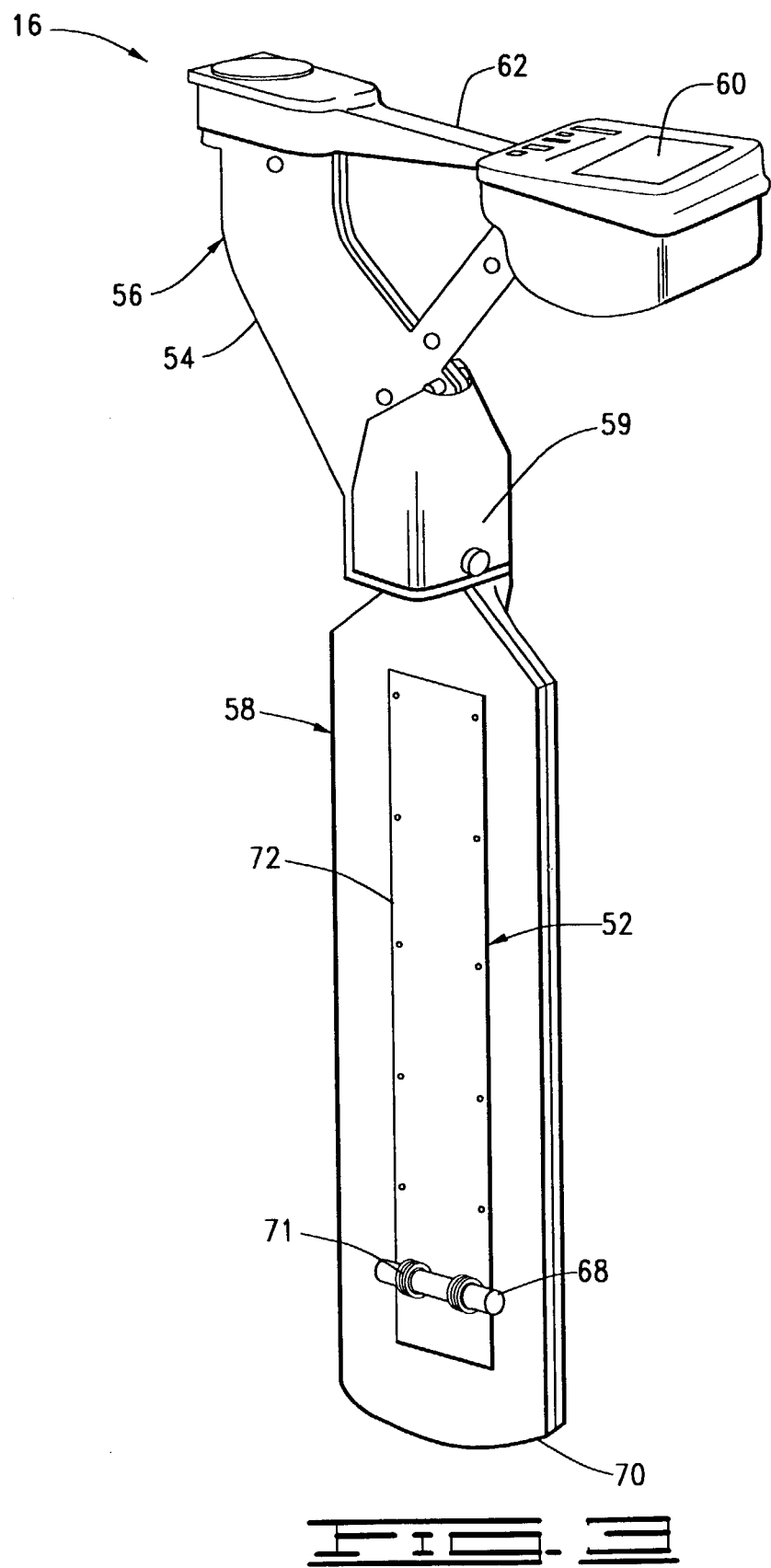
FIG. 3 is a perspective view of a monitoring system constructed in accordance with the present invention.

Turning now to FIG. 3, there is shown therein an embodiment of the monitoring system 16 of the present invention. The monitoring system 16 is adapted to monitor the position and orientation of the downhole tool assembly 18 (shown in FIGS. 1 & 2) by detecting the signal 41. The monitoring system 16 comprises an antenna assembly 52 adapted to detect the signal 41 from the sensor assembly 40 and to transmit the detected signal to a yet to be described processor. In FIG. 3, the monitoring system is shown to have a frame 54 comprising a handheld unit having an upper portion 56 and a lower portion 58.

The upper portion 56 includes a battery compartment 59, a liquid crystal display ("LCD") 60, a handle 62 for carrying the monitoring system 16. The battery compartment 59 is used to secure a power supply within the frame 54 during operation of the monitoring system 16. The LCD 60 is adapted to visually communicate various operational parameters to the operator (not shown), including the orientation of the downhole tool assembly 18.

The antenna assembly 52 is adapted to detect the signal 41 transmitted by the sensor assembly 40 (shown in FIG. 2) and to transmit the detected signals to a processor. The antenna assembly 52 may comprise a plurality of antennas operatively connected to a circuit board 72 and adapted to detect the signal 41 transmitted from the sensor assembly 40. Antenna 68 is shown to illustrate one possible antenna configuration capable of detecting the electromagnetic orientation signal 41 transmitted by the sensor assembly 40. Antenna 68 may comprise an antenna with a center-tapped coil 71 including a ferrite rod to increase the magnetic flux through the coil. Antennas suitable for use with the present invention are disclosed in U.S. Pat. No. 5,264,795, issued to Rider the contents of which are incorporated by reference herein.

Figure 4:
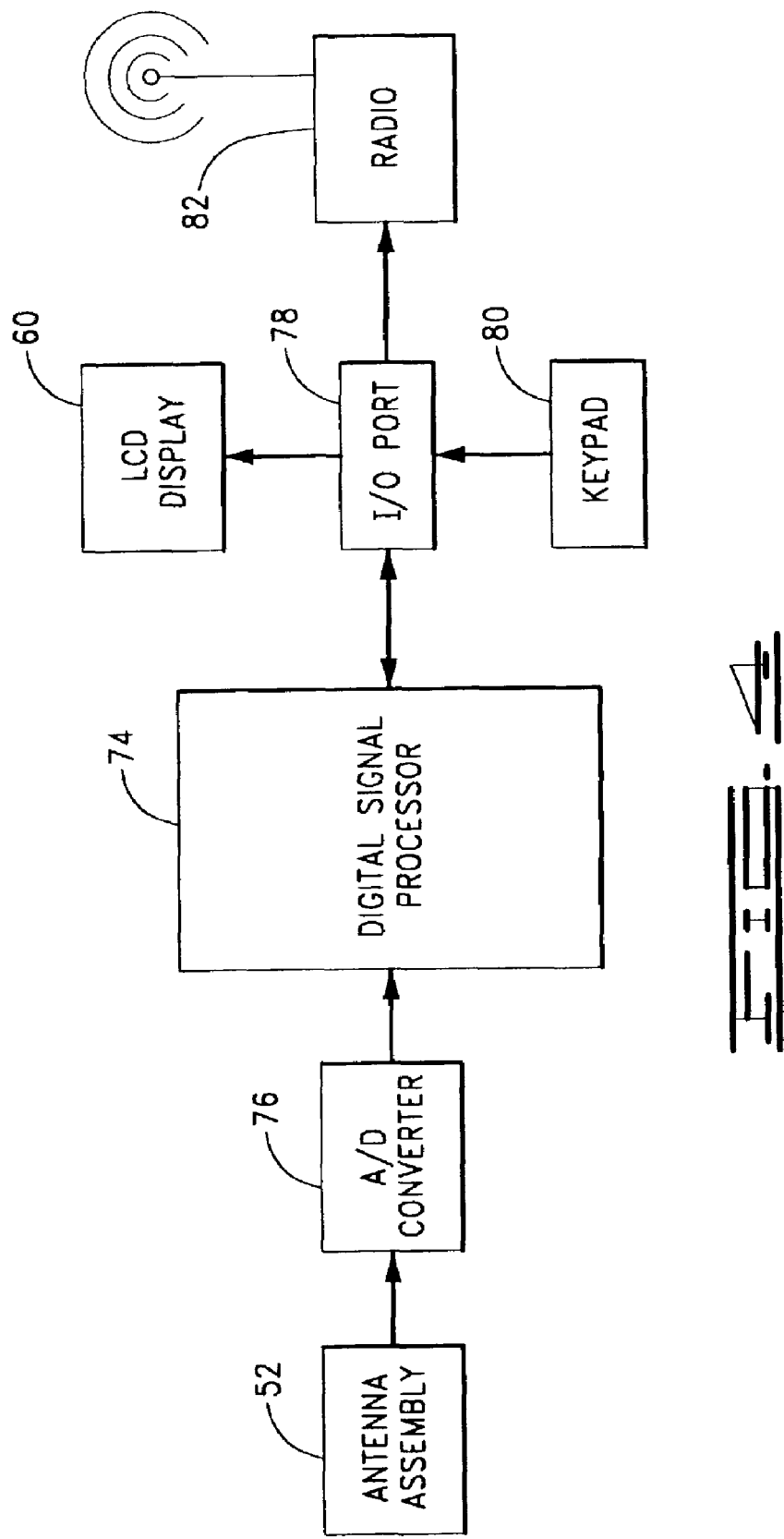
FIG. 4 is a block diagram illustrating the preferred hardware comprising the monitoring system constructed to detect and process signals transmitted from the sensor assembly.

Turning now to FIG. 4, the way in which the monitoring system 16 determines the actual orientation of the downhole tool assembly 18 using the actual orientation of the sensor assembly 40 and a predetermined calibration factor will be discussed. The monitoring system 16 comprises the antenna assembly 52 and a processor assembly 74. Additionally, the system may comprise an analog/digital ("A/D") converter 76, an Input/Output ("I/O") Port 78, the LCD 60, an keypad 80, and a data radio 82.

The antenna assembly 52, as previously discussed, detects the orientation signals 41 emanating from the sensor assembly 40. The antenna assembly 52 may also provide initial amplification and conditioning of the detected signals. The antenna assembly 52 is also adapted to transmit the detected signals to the processor assembly 74 by way of the A/D converter 76.

The A/D converter 76 accepts the detected signals from the antenna assembly 52 as analog signals, converts the detected signals to digital signals, and transfers the digital signals to the processor assembly 74. In some instances, the processor assembly 74 may control the start and end of the conversion process in the A/D converter 76.

The processor assembly 74 is adapted to predetermine a calibration factor indicative of the actual orientation of the sensor assembly 40 relative to a known downhole tool assembly 18 orientation. The calibration factor is determined prior to the start of the boring process and thereafter used to determine the actual orientation of the downhole tool assembly 18 as the boring operation progresses. The processor assembly 74 thereafter processes the detected signals according to the predetermined calibration factor to determine an actual orientation of the downhole tool assembly 18 using the actual orientation of the sensor assembly 40 and the calibration factor.

The processor 74 may control the function of the A/D converter 76 and the I/O port 78. The functions performed by the processor 74 may also be controlled by input received from the keypad 80.

The I/O port 78 receives and transmits data to and from the processor 74. The I/O port 78 is comprised of a data link interface to a wireless telemetry transmitter known as a data radio 82 which transmits data to a remote display (not shown) for drilling machine 24 operator observation and control. Use of data radio 82 allows the drilling machine operator and monitoring system operator to simultaneously view the information displayed on the LCD 60.

When the operator wishes to monitor the orientation of the downhole tool assembly 18, the monitoring system 16 of FIG. 4 and the sensor assembly 40 operate as follows. The sensor assembly 40 is positioned within the downhole tool assembly 18 (FIG. 2) and activated to transmit the orientation signal 41 to the antenna assembly 52. The operator instructs the processor assembly 74 to calculate the calibration factor. The processor then stores the calibration factor in its memory.

During the boring operation, the sensor assembly 40 transmits the signal 41 to the antenna assembly 52. In response, the antenna assembly 52 generates a corresponding detected signal, containing the orientation data attached to the signal 41, for transmission to the processor assembly 74.

The detected signal is transferred to the A/D converter 76 where it is converted into a digital signal and passed to the processor assembly 74. The processor assembly 74 may continuously receive detected signals from the antenna assembly 52, and process the signals to determine an actual orientation of the downhole tool assembly 18 using the actual orientation of the sensor assembly 40 and the stored calibration factor. The processor assembly 74 then transfers the actual orientation of the downhole tool assembly 18 information to the LCD 60 and remote display for communication to the operator.

Figures 5, 6:
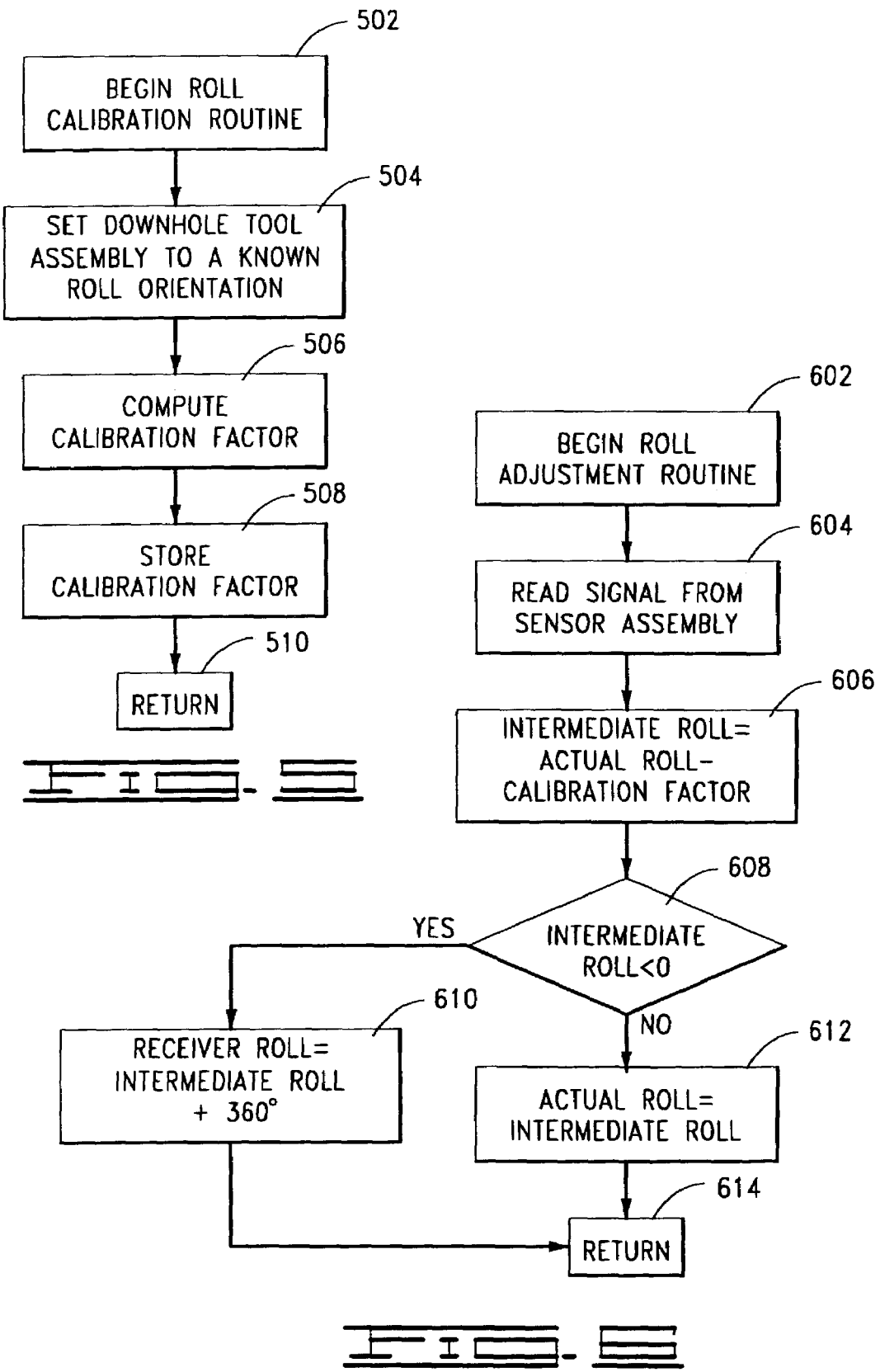
FIG. 5 is a flow chart of the steps carried out to determine a calibration factor indicative of the actual roll orientation of the sensor assembly relative to a known downhole tool assembly roll orientation.
FIG. 6 is a flow chart illustrating a roll adjustment routine used to determine the actual roll orientation of the downhole tool assembly.

Turning now to FIG. 5, a routine for calculating a roll angle calibration factor for use when determining roll of the downhole tool assembly 18 is illustrated. The roll angle calibration factor is indicative of the roll angle offset between the sensor assembly 40 and the downhole tool assembly 18. The roll angle calibration routine is performed with the downhole tool assembly 18 (FIG. 2) at a known orientation.

The roll calibration begins (step 502), and the downhole tool assembly 18 is set to a known orientation (step 504). Preferably, the downhole tool assembly 18 is set so that the directional boring tool 20 orientation corresponds to a desired steering position. Typically, the desired position is with the boring tool oriented to cause the drill string to move in an upward direction, normally referred to as zero degrees, or the twelve o'clock position. However, it will be appreciated that the boring tool 20 and downhole tool assembly may be set at any other known orientation.

With the downhole tool assembly 18 at the known orientation, the sensor assembly 40 (FIG. 2) transmits the signal 41 to the antenna assembly 52. The signal 41 contains the actual roll orientation of the sensor assembly 40. The antenna assembly 52 detects the signal 41 and then transmits the detected signal to the processor assembly 74 (FIG. 4). The processor assembly 74 assumes that the downhole tool assembly 18 has been set at a known reference orientation, as described above, and computes the calibration factor (step 506) as being equal to the offset of the actual sensor assembly 52 orientation relative to the known orientation of the downhole tool assembly. The processor assembly 74 then stores the calibration factor in memory (step 508) and the roll calibration is ended (step 510).

The stored calibration factor is then later accessed when the operator wishes to determine the actual orientation of the downhole tool assembly by performing a roll adjustment routine. The roll adjustment routine of the monitoring system is illustrated in FIG. 6. With reference also to FIG. 4, when the roll adjustment routine is implemented (step 602), the antenna assembly 52 detects the electromagnetic orientation signal 41 from the sensor assembly 40 (FIG. 2) and transmits the orientation data contained thereon to the processor assembly 74 via the A/D converter 76 (step 604). The processor assembly 74 reads the data transmitted from the antenna assembly 52 to determine the actual orientation of the sensor assembly 40. The calibration factor is then subtracted from the actual orientation of the sensor assembly 40 to get an intermediate roll value for the downhole tool assembly 18 (step 606).

The intermediate roll value is either a positive or a negative value, giving the intermediate roll value either a positive sign or a negative sign. If the intermediate roll value is less than zero (step 608), then the actual orientation of the downhole tool assembly is equal to the intermediate roll plus three hundred and sixty degrees (360°) (step 610). If the intermediate roll value is not less than zero (step 608), then the actual orientation of the downhole tool assembly 18 is equal to the intermediate roll value (step 612). The roll adjustment routine is then complete (step 614) and the actual orientation of the downhole tool assembly 18 is communicated to the operator via the LCD 60.

Turning now to FIG. 7, a pitch calibration routine is illustrated therein. The pitch angle calibration routine is used to determine a calibration factor that is indicative of pitch angle offset for different pitch angles. The pitch angle calibration is performed with the downhole tool assembly 18 (FIG. 2) at a known pitch orientation.

The pitch calibration begins (step 702), and the downhole tool assembly 18 is set to a known orientation (step 704). Preferably, the downhole tool assembly is set so that the housing 36 orientation corresponds to a position at zero degrees, or level with horizontal. However, it will be appreciated that the housing 36 and downhole tool assembly may be set at any other known pitch orientation.

With the sensor assembly 40 positioned within the downhole tool assembly 18 and the downhole tool assembly at the known orientation, the sensor assembly 40 (FIG. 2) is activated to transmit a signal, containing the actual pitch angle of the sensor assembly, to the antenna assembly 52. The antenna assembly 52 detects the signal and then transmits the detected signal to the processor assembly 74 (FIG. 4). The processor assembly 74 assumes that the downhole tool assembly 18 has been set at a known reference orientation, as described above, and then computes the calibration factor as being equal to the offset of the actual sensor assembly 52 pitch orientation relative to the known pitch orientation of the downhole tool assembly (step 706). The processor assembly 74 then stores the calibration factor in memory (step 708) and the pitch calibration routine is ended (step 710).

The pitch adjustment routine of the monitoring system 16 is illustrated in FIG. 8. The pitch adjustment routine allows the operator to determine the pitch orientation of the downhole tool assembly 18 without the need for positioning the sensor assembly 40 within the downhole tool assembly at precisely the same pitch as the downhole tool assembly. With reference to FIG. 4, when the pitch adjustment routine is implemented (step 802), the antenna assembly 52 detects the orientation signal from the sensor assembly 40 (FIG. 2) and transmits the detected signal with pitch orientation data contained thereon to the processor assembly 74 (step 804). The processor assembly 74 reads the pitch orientation data to determine the actual pitch orientation of the sensor assembly 40. The value of the calibration factor is then subtracted from the value of the actual pitch orientation of the sensor assembly to get an actual corrected pitch value for the downhole tool assembly 18 (step 806).

The actual pitch value is either a positive or a negative value, giving the corrected pitch value either a positive sign or a negative sign. If the intermediate pitch value is less than zero, then the actual pitch orientation of the downhole tool assembly 18 is negative. If the corrected pitch value is not less than zero, then the actual orientation of the downhole tool assembly is either equal or positive to the horizontal reference. The pitch adjustment routine is then complete (step 808) and the actual pitch orientation of the downhole tool assembly 18 is communicated to the operator via the LCD 60.

The present invention also comprises a method for monitoring the orientation of the downhole tool assembly 18. In accordance with the method of the present invention, the orientation of the downhole tool assembly 18 is monitored using the monitoring system 16. The downhole tool assembly 18 has a sensor assembly 40 that is adapted to sense at least one orientation parameter of the downhole tool assembly 18. For purposes of illustration, the present method will be described with reference to monitoring the roll orientation of the downhole tool assembly 18. However, it will be appreciated that the present method may be used to monitor the roll, pitch and/or yaw orientation of the downhole tool assembly.

The downhole tool assembly is positioned at a known roll orientation. For example, the downhole tool assembly 18 may be orientated so that an attached boring tool 20 is oriented at twelve o'clock. The sensor assembly 40 transmits a signal indicative of the actual orientation of the sensor assembly to the above-ground monitoring system 16. The monitoring system 16 processes the signal 41 to electronically calculate a calibration factor corresponding to the difference between the known roll orientation of the downhole tool assembly 18 and the actual roll orientation of the sensor assembly 40.

The calibration factor is stored for use to later determine the actual orientation of the downhole tool assembly 18, as the assembly is moved through the ground. The operator may advance and alter the position of the downhole tool assembly 18 in response to the signal by operating the HDD machine 24 to rotate and thrust forward the downhole tool assembly. The monitoring system 16 retrieves and uses the calibration factor to monitor changes in the roll orientation of the downhole tool assembly 18 by calculating an actual orientation of the downhole tool assembly using the actual orientation of the sensor assembly 40 and the calibration factor.

In accordance with the present method, the monitoring system 16 may be adapted to display the actual orientation of the downhole tool assembly 18. Further, the monitoring system 16 may be adapted to process the signal to determine the distance between the downhole tool assembly 18 and monitoring system 16. Additionally, the monitoring system may be adapted to determine the approximate underground location of the downhole tool assembly 18 as the boring operation progresses. Monitoring systems 16 and associated devices suitable for locating the downhole tool assembly 18 and determining the distance between the downhole tool assembly and the monitoring system are disclosed in U.S. Pat. No. 5,264,795, issued to Rider, U.S. Pat. No. 5,703,484, issued to Bieberdorf, et al., U.S. Pat. No. 5,850,624, issued to Gard, et al., and U.S. Pat. No. 5,880,680, issued to Wisehart, et al.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A horizontal directional drilling system comprising:
    a horizontal directional drilling machine;
    a drill string connectable to the horizontal directional drilling machine;
    a downhole tool assembly supported on the drill string;
    a sensor assembly supported by the downhole tool assembly for movement therewith;
    wherein the sensor assembly transmits at least one sensor assembly signal containing sensor assembly orientation information; and
    a monitoring system adapted to monitor the position and orientation of the downhole tool assembly, the monitoring system comprising:
        an antenna assembly adapted to detect the sensor assembly signal; and
        a processor assembly adapted to determine an orientation of the sensor assembly using the sensor assembly signal detected by the antenna assembly, to predetermine a calibration factor indicative of the orientation of the sensor assembly relative to a known downhole tool assembly orientation, to later determine an orientation of the downhole tool assembly using the sensor assembly signal and the predetermined calibration factor while the downhole tool assembly is in use.

2. The horizontal directional drilling system of claim 1 wherein the monitoring system comprises a portable frame adapted to support the antenna assembly and the processor assembly.

3. The horizontal directional drilling system of claim 2 further comprising a display supported on the portable frame and adapted to communicate orientation of the downhole tool assembly.

4. The horizontal directional drilling system of claim 1 wherein the sensor assembly signal comprises a dipole magnetic field signal.

5. The horizontal directional drilling system of claim 1 wherein the sensor assembly comprises a roll sensor adapted to sense a roll orientation of the sensor assembly.

6. The horizontal directional drilling system of claim 1 wherein the processor assembly is adapted to calculate the distance between the antenna assembly and the downhole tool assembly by measuring the strength of the sensor assembly signal.

7. The horizontal directional drilling system of claim 1 wherein the sensor assembly comprises a pitch sensor adapted to sense a pitch orientation of the sensor assembly.

8. The horizontal directional drilling system of claim 1 wherein the sensor assembly comprises a pitch sensor adapted to sense a pitch orientation of the sensor assembly and a roll sensor adapted to sense a roll orientation of the sensor assembly.

9. The horizontal directional drilling system of claim 1 wherein the sensor assembly comprises an orientation sensor adapted to measure at least one orientation component of the downhole tool assembly and a separate transmitter adapted to transmit the sensor assembly signal comprising an electromagnetic signal having orientation information encoded thereon, to the antenna assembly.

10. A monitoring system for use with a horizontal directional drilling machine to monitor the position and orientation of a downhole tool assembly, the downhole tool assembly having a sensor assembly supported thereon for movement with the downhole tool assembly, wherein the sensor assembly transmits at least one sensor assembly signal containing sensor assembly orientation information; the monitoring system comprising:
    an antenna assembly adapted to detect the sensor assembly signal; and
    a processor assembly adapted to determine an orientation of the sensor assembly using the sensor assembly signal detected by the antenna assembly, to predetermine a calibration factor indicative of the orientation of the sensor assembly relative to a known downhole tool assembly orientation, to later determine an orientation of the downhole tool assembly based on the sensor assembly signal and the calibration factor while the downhole tool assembly is in use.

11. The monitoring system of claim 10 wherein the monitoring system comprises a portable frame adapted to support the antenna assembly and processor assembly.

12. The monitoring system of claim 11 further comprising a display adapted to communicate orientation of the downhole tool assembly.

13. The monitoring system of claim 10 wherein the sensor assembly comprises a pitch sensor, and wherein the monitoring system is adapted to determine a pitch orientation of the downhole tool assembly using the sensor assembly signal and the calibration factor.

14. The monitoring system of claim 10 wherein the sensor assembly comprises a roll sensor, and wherein the monitoring system is adapted to determine a roll orientation of the downhole tool assembly using the sensor assembly signal and the calibration factor.

15. The monitoring system of claim 10 wherein the sensor assembly comprises a roll sensor and a pitch sensor, and wherein the monitoring system is adapted to determine a roll orientation and a pitch orientation of the downhole tool assembly using the sensor assembly signal and the calibration factor.

16. A method for monitoring the orientation of a downhole tool assembly having a sensor assembly adapted to sense at least one orientation parameter of the downhole tool assembly during a boring operation using a monitoring system, the method comprising:
  positioning the downhole tool assembly at a known orientation;
  transmitting at least one sensor assembly orientation signal;
  detecting the at least one sensor assembly orientation signal;
  processing the detected at least one sensor assembly orientation signal to determine an orientation of the sensor assembly;
  calculating a calibration factor corresponding to a difference between the orientation of the sensor assembly and the known orientation of the downhole tool assembly;
  monitoring and conveying changes in orientation of the downhole tool assembly by calculating an actual orientation of the downhole tool assembly using the sensor assembly orientation signal and the calibration factor.

17. The method of claim 16 further comprising displaying orientation of the downhole tool assembly at the monitoring system.

18. The method of claim 16 wherein processing the sensor assembly orientation signal further comprises determining the distance between the downhole tool assembly and the monitoring system.

19. The method of claim 16 further comprising locating a point on the ground corresponding to the approximate underground location of the downhole tool assembly, during the boring operation, by measuring a signal strength of the sensor assembly orientation signal.

20. The method of claim 16 wherein the sensor assembly orientation signal comprises roll angle data and wherein calculating the actual orientation of the downhole tool assembly comprises using roll angle data and the calibration factor to determine roll orientation of the downhole tool assembly.

21. The method of claim 16 wherein the sensor assembly orientation signal comprises pitch angle data and wherein calculating the actual orientation of the downhole tool assembly comprises using the pitch angle data and the calibration factor to determine a pitch orientation of the downhole tool assembly.

22. A method for boring underground using a horizontal directional drilling system, the system comprising a horizontal directional drilling machine, a drill string operatively connected to the drilling machine, a downhole tool assembly connectable to the drill string, a sensor assembly supported by the drill string, and an above-ground monitoring system adapted to monitor the position and orientation of the downhole tool assembly, the method comprising:
  positioning the downhole tool assembly at a known orientation;
  transmitting a sensor assembly signal from the sensor assembly;
  sensing the sensor assembly signal using the above-ground monitoring system,
  processing the sensor assembly signal to determine an orientation of the sensor assembly:
  electronically calculating a calibration factor corresponding to the difference between the known orientation of the downhole tool assembly and the orientation of the sensor assembly with the downhole tool assembly at the known orientation;
  advancing and altering the position of the downhole tool assembly by operation of the horizontal directional drilling machine to move the downhole tool assembly along a boring path; and
  monitoring and conveying changes in orientation of the downhole tool assembly as it travels along the boring path by calculating an orientation of the downhole tool assembly using the sensor assembly signal and the calibration factor.

23. The method of claim 22 further comprising displaying orientation of the downhole tool assembly at the monitoring system.

24. The method of claim 22 wherein processing the sensor assembly signal further comprises determining the distance between the downhole tool assembly and the monitoring system.

25. The method of claim 22 further comprising locating a point on the ground corresponding to the approximate underground location of the downhole tool assembly, during the boring operation, by measuring the strength of the sensor assembly signal.

26. The method of claim 22 wherein the sensor assembly signal comprises roll angle data and wherein calculating orientation of the downhole tool assembly comprises using the roll angle data and the calibration factor to determine a roll orientation of the downhole tool assembly.

27. The method of claim 22 wherein the sensor assembly signal comprises pitch angle data and wherein calculating an actual orientation of the downhole tool assembly comprises using the pitch angle data and the calibration factor to determine a pitch orientation of the downhole tool assembly.

28. The method of claim 22 wherein the sensor assembly signal comprises pitch angle data and roll angle data and wherein calculating an orientation of the downhole tool assembly comprises using pitch angle data, the roll angle data, and the calibration factor to determine pitch and roll orientation of the downhole tool assembly.

29. A method for drilling a borehole using a horizontal directional drilling system, the system comprising a horizontal directional drilling machine having a drill string operatively connected to the drilling machine, a downhole tool assembly operatively connected to the drill string, a sensor assembly supported by the downhole tool assembly, and an above-ground monitoring system; the method comprising:

positioning the downhole tool assembly at a known orientation;

transmitting a sensor assembly orientation signal from the sensor assembly;

sensing the sensor assembly orientation signal using the above-ground monitoring system;

processing the sensor assembly orientation signal to determine an orientation of the sensor assembly;

electronically calculating a calibration factor corresponding to the difference between the known orientation of the downhole tool assembly and the orientation of the sensor assembly when the downhole tool assembly is at the known orientation;

advancing and altering the position of the downhole tool assembly by operating the horizontal directional drilling machine to move the downhole tool assembly along a boring path; and monitoring and conveying orientation changes of the downhole tool assembly as it moves along the boring path by calculating an orientation of the downhole tool assembly using the sensor assembly orientation signal and the calibration factor.

30. The method of claim 29 further comprising displaying orientation of the downhole tool assembly at the monitoring system.

31. The method of claim 29 wherein processing the sensor assembly orientation signal further comprises determining the distance between the downhole tool assembly and the monitoring system.

32. The method of claim 29 further comprising locating a point on the ground corresponding to the approximate underground location of the downhole tool assembly, during the boring operation, by measuring a signal strength of the sensor assembly orientation signal.

33. The method of claim 29 wherein the sensor assembly assembly orientation signal comprises pitch angle data and wherein calculating an orientation of the downhole tool assembly comprises using the pitch angle data and the calibration factor to determine a pitch orientation of The downhole tool assembly.

34. The method of claim 29 wherein the downhole tool assembly comprises a directional drilling bit, the method further comprising:

rotating the directional drilling bit by rotating the drill string and simultaneously advancing the directional drilling bit to bore a substantially straight segment of the borehole; and changing direction of the borehole by advancing the directional drilling bit without rotation.

35. The method of claim 34 wherein changing the direction of the borehole further comprises orienting the directional drilling bit in response to the sensor assembly orientation signal for the desired direction change by rotation of the drill string prior to advancing without rotation.

36. The method of claim 34 further comprising:

determining a pitch of the directional drilling bit using the sensor assembly orientation signal and the monitoring system; and adjusting pitch of the directional drilling bit using the determined pitch.

* * * * *